Sept. 9, 1941. D. BROIDO 2,255,148
DEVICE FOR READING AND ANALYZING RECORD CARDS
Filed Nov. 26, 1937 4 Sheets-Sheet 1

INVENTOR
Daniel Broido
BY
ATTORNEY

Sept. 9, 1941.   D. BROIDO   2,255,148
DEVICE FOR READING AND ANALYZING RECORD CARDS
Filed Nov. 26, 1937   4 Sheets-Sheet 2

INVENTOR
Daniel Broido
BY
ATTORNEY

Sept. 9, 1941.  D. BROIDO  2,255,148
DEVICE FOR READING AND ANALYZING RECORD CARDS
Filed Nov. 26, 1937    4 Sheets-Sheet 3

INVENTOR
Daniel Broido.
BY
ATTORNEY

Sept. 9, 1941.  D. BROIDO  2,255,148
DEVICE FOR READING AND ANALYZING RECORD CARDS
Filed Nov. 26, 1937   4 Sheets-Sheet 4

INVENTOR
Daniel Broido
BY
ATTORNEY

Patented Sept. 9, 1941

2,255,148

UNITED STATES PATENT OFFICE 2,255,148

DEVICE FOR READING AND ANALYZING RECORD CARDS

Daniel Broido, London, England

Application November 26, 1937, Serial No. 176,442
In Great Britain November 26, 1936

4 Claims. (Cl. 235—61.11)

This invention relates to a device for reading and analyzing information represented by the selective projection of elements representing respectively the various denominational digits of the information to be registered.

The object of the present invention is to provide a simplified transmission mechanism, employing only a single control device, for entering the analyzed information into a totalizing register.

A further object of the present invention is to provide a device of the kind in question in which the control device is actuated by impulses obtained by the operation of electric contact members.

Figure 4:
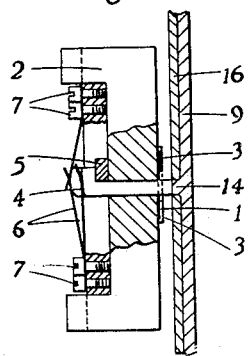
Figure 4 is a section on the line IV—IV of Figure 1.

A single-dimensional perforated record or result screen 1 is placed (by hand or automatically by means not shown in the drawings) in a working position between a metallic box 2 and guides 3. The selector box 2 contains a number of sensing plates 4, one plate 4 being provided for each value of each digit the device is required to transmit. Before the record 1 is inserted, the plates 4 are pressed outwardly by a bar 5 against the action of springs 6 secured by screws 7, but as soon as the record 1 is placed into the working position, the bar 5 is released, and the sensing plates 4 are pushed by their springs 6 towards the record 1. Any sensing plates 4 which meet a perforation 8 in the record 1 project therethrough as shown in Figure 4, the remainder being retained behind the record 1; therefore, the number or item represented by the perforations 8 will be now represented by sensing plates 4 protruding through the record 1.

Figure 2:
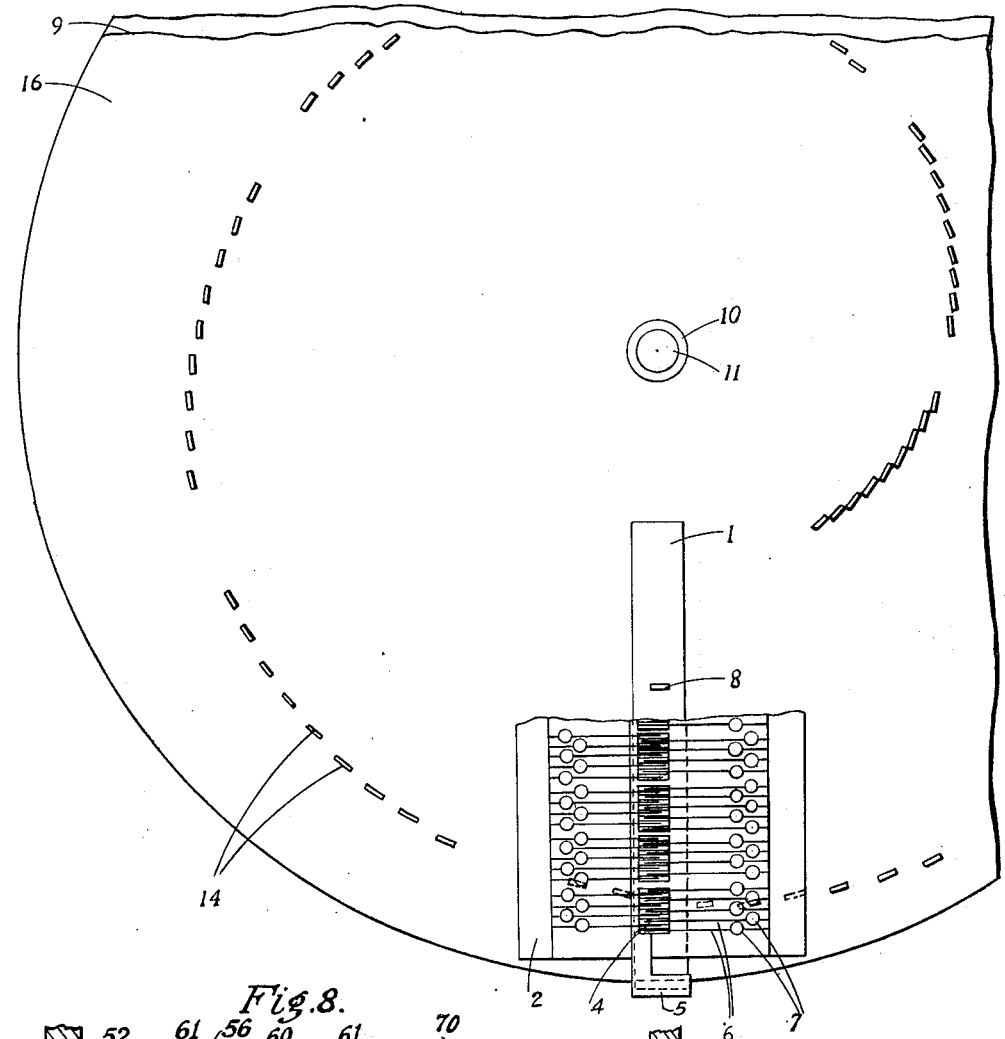
Figure 2 is a front elevation of Figure 1.

An analyzing member 9 of electrically conducting material, is rigidly mounted on an insulating bush 10 on a shaft 11 supported in the side frames 12, 13 of a registering machine hereinafter described. The shaft 11 in the present case is rotated by a handle 11'. A series of studs 14 are mounted on the face of the analyzing member 9 along a spiral line, each stud 14 being individual to a numeral or digit value of a number to be transmitted. The arrangement is such that the radial distance of a stud 14 from the centre line of shaft 11 equals the distance from the same line of the sensing plate 4 representing the same digit value; therefore, when a stud 14 passes through the vertical centre plane of Figure 2, it is exactly opposite its corresponding plate 4, and would touch it if the sensing plate happens to project through a perforation in the record 1.

The face of analyzing member 9 between studs 14 may, if desired, be covered with an insulating layer 16 so that the studs 14 lie flush with the surface of said layer. A bracket 17 carries a brush 18 adapted to make sliding contact with the hub 19 of the analyzing member 9. An electrical circuit is established between said brush 18 and the box 2 through an electro-magnetic relay device 20 and a source of electrical energy 21. The said relay device 20 is adapted, when energized, to break the circuit of and thereby de-energize an electro-magnet 22 adapted to control the numeral wheel clutches of a printing and registering apparatus.

Said register device comprises a plurality of cams 50 rigidly mounted on the shaft 11 to which the analyzing member 9 is secured, one cam 50 being provided for each denomination to be transmitted. A gear segment 51 is fixed to each cam 50, each of said gear segments 51 being adapted to turn a corresponding toothed wheel bush 52 rotatably mounted on a shaft 53. A clutch member 54 is mounted on each bush 52, so that it is free to slide axially thereon but is compelled to rotate therewith.

Figure 8:
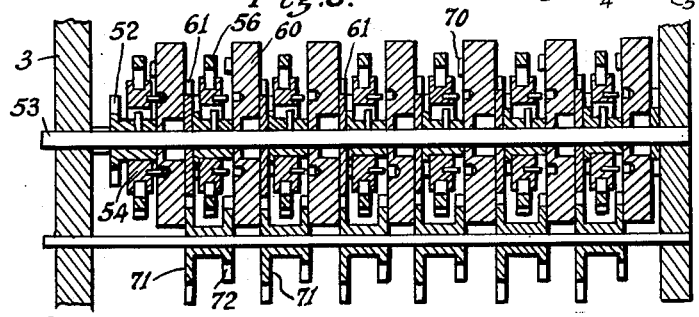
Figure 8 is a section on line VIII—VIII, Figure 3.
Figure 3:
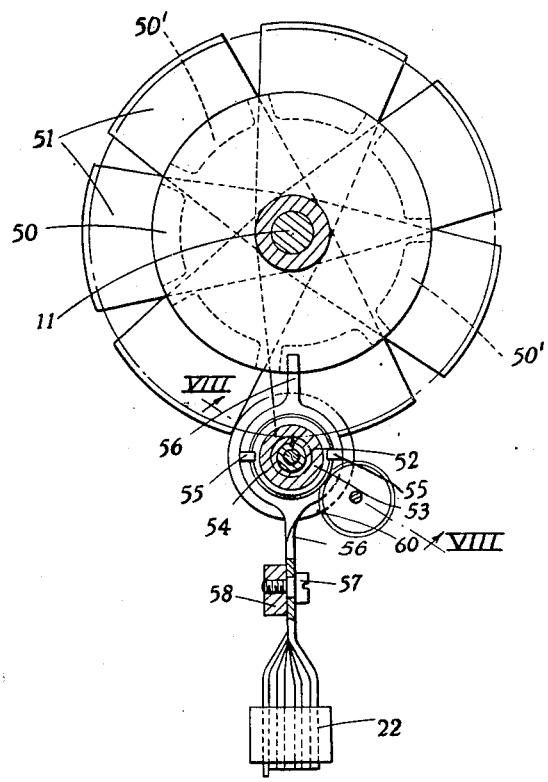
Figure 3 is a section on the line III—III of Figure 1.

Each clutch member 54 is adapted to be engaged and moved axially on its bush 52 by two pins 55 carried by a clutch fork 56 rockably mounted on bolts 57 in a bar 58, and each of said clutch members 54 is provided with a pin or pins 59 adapted to engage recesses in a numeral wheel 60 to which is fixed a pinion 61 for operating further registers, stop wheels, etc., not shown in the drawings. Each of the numeral wheels 60 carries a zero stud 70 arranged to actuate respectively a wheel of the carry device (Figures 3 and 8). As shown in Figure 8, the carry device comprises two gear wheels 71, 72, formed as a unit, of which one, 71, is in mesh with a pinion 73 fixed to the next higher numeral wheel 60. The other gear wheel 72 is actuated by the zero stud 70 on the lower numeral wheel 60. Thus, the carry is effected in the usual way, the zero studs 70 stepping the next higher numeral wheels as and when required. The lower ends of said clutch forks 56 are maintained against the face of the electro-magnet 22 when same is energized, but otherwise said clutch forks 56 are drawn out of magnetic reach of said electro-magnet by springs 62 fixed to the side frame 13 and their upper ends caused to bear against the faces of the said cams 50 which are provided each with a recess 50'.

The cams 50 and the corresponding gear segments 51 are off-set in such a manner that when the shaft 11 is driven, the gear segments 51 turn the toothed wheel bushes 52 in consecutive order at the same time as the analyzing member 9 brings the studs 14 of the corresponding digit series in front of record 1 and selector box 2. When a gear segment 51 is in mesh with its bush 52 its cam 50 is in such a position that its recess 50' is opposite the upper end of the corresponding clutch fork 56, so that this one clutch fork 56 is free to swing around its pivot bolt 57 when the electro-magnet 22 is actuated, whereas all other clutch forks 56 are locked by their respective cams 50.

In the initial position all clutch members 54 are disengaged from the numeral wheels 60 because all clutch forks 56 are locked by their cams 50. On turning the shaft 11, the gear segment 51 of the first denominational transmission unit will start to turn its respective toothed wheel bush 52 and the clutch member 54 of the same unit, and the cam 50 turns its recess 50' towards the upper end of the clutch fork 56 of the same unit, so that this clutch fork is free to move if and when a contact is established between a stud 14 on analyzing member 9 and one of the sensing plates 4 which are projecting through a perforation in the record 1. If such a contact is established, the electro-magnet 22 is de-energized and the said clutch fork 56 swings under the influence of its spring 62 around its pivot bolt 57, thereby engaging the numeral wheel 60 and turning same until the first gear segment 51 is out of mesh with its respective toothed wheel bush 52, whereupon the clutch fork 56 is again brought to bear against the electro-magnet 22 by the cam 50. This operation is repeated once for each digit to be transferred, whereupon the bar 5 is moved outwardly, thereby withdrawing the sensing plates 4 from the record 1 which is then free to drop into a suitable container.

In the form described the member 9 has seven groups of studs 14, each group comprising nine studs. The record cards, similarly, have seven denominational areas, disposed vertically one above the other, each area being sub-divided into nine sub-areas, representing, respectively, the values 1–9. The arrangement is such that each group of studs 14 is associated with one area on the record card, and each stud of each group is associated with one sub-area of the said area. In the analyzing position, best shown in Figure 2, when the shaft 11 is rotated by handle 11' through one complete revolution, each stud as it passes by the card is aligned with the sub-area with which it is associated. In the case that any one of the values 1–9 is to be transferred from each of the areas of the card, plates 4 will project through the corresponding sub-areas of each area. Thus, during one complete analyzing cycle of the member 9, each of said projecting plates 4 will be respectively and progressively contacted by its associated stud 14. There is no stud 14 in any group, and no sub-area in any area, for zero. Consequently, if zero is to be registered in any denomination no plate 4 will project in that denominational area of the card 1, and the corresponding denominational numeral wheel will not be driven at all, since the magnet 22 will not be de-energized. The numeral wheel thus remains in the starting position (in which it indicates zero). In the form described the values of each area on the card are sensed progressively from 9–1.

Figure 1:
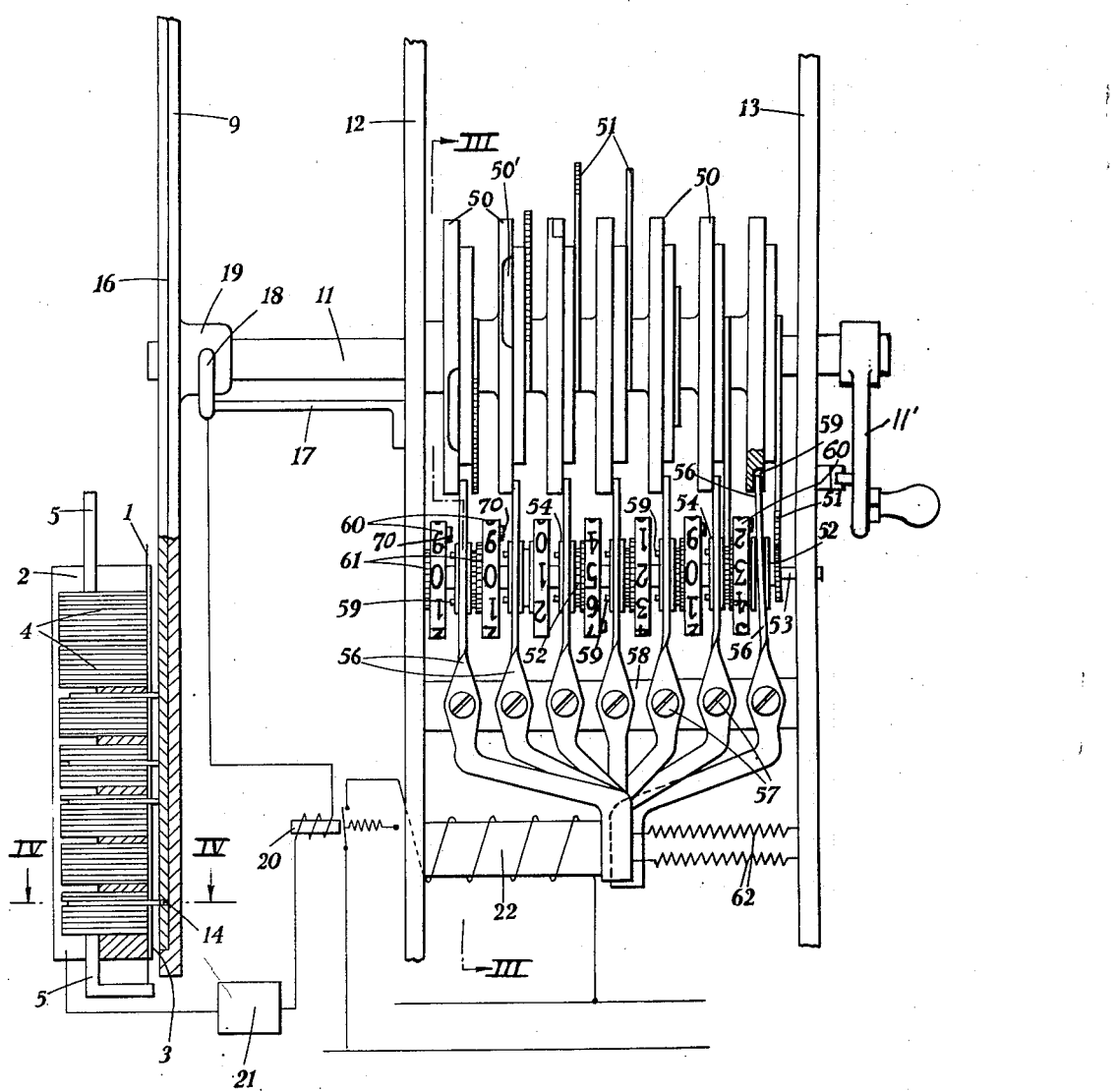
Figure 1 is a side elevation, partly in section, of one embodiment of this invention.

As shown in Figure 1, it is assumed that the first card 1 to be analyzed represents the various denominational values 3025100, and plates 4 project through the first, third, fourth and fifth areas on the card 1 in the sub-areas corresponding respectively to the values 3, 2, 5 and 1. No plates project through the second, sixth and seventh areas. Thus, when the first (highest) denominational group is being analyzed, the relevant numeral wheel 60 is driven by its clutch 54 when the seventh stud 14 of the corresponding group contacts the projecting plate 4. Thereupon the magnet 22 is de-energized, the appropriate clutch 54 engages the corresponding numeral wheel and drives it for three steps, whereupon the clutch is disengaged by the cam 50 and the numeral wheel is arrested in the position in which the numeral 3 is disclosed. In the next denomination, no plate 4 projects from the corresponding area of the card 1, consequently the associated numeral wheel will not be driven and will continue to display zero, as above described. The succeeding denominations are all registered in like manner.

The complete transmission of a figure from the record 1 on to the numeral wheels 60 of the registering mechanism is effected during one revolution of the main shaft 11.

The apparatus described and illustrated is intended for totalizing only, the register wheels being zeroized by hand, if required.

It is understood that the numeral wheels 60 form an accumulating register and further devices and registers may be provided for printing, etc., of the intermediate items.

The relay device 20 and its separate circuit may be dispensed with if the action of the electro-magnet 22 is reversed, so that it causes the clutch forks 56 to engage the respective clutches 54 when its circuit is closed by a stud 14 and a sensing plate 4 instead of when its circuit is interrupted. It is understood that in this case the action of the springs 62 should be also reversed.

Figure 5:
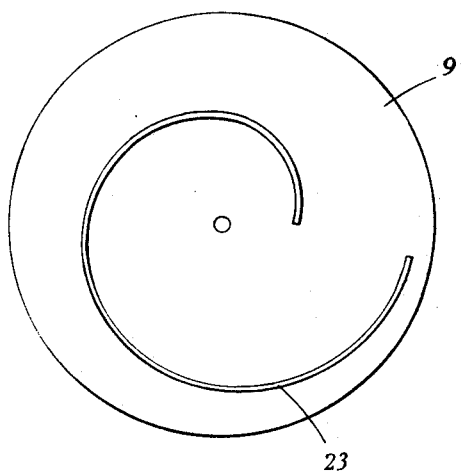
Figure 5 is a front elevation on a reduced scale of a modified form of the analyzing member shown in Figures 1 and 2.
Figure 6:
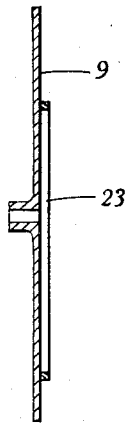
Figure 6 is a sectional side elevation of Figure 5.

The modified analyzing member 9 illustrated in Figures 5 and 6 is provided with a continuous spiral 23 of electrically conducting material instead of the studs 14.

Figure 7:
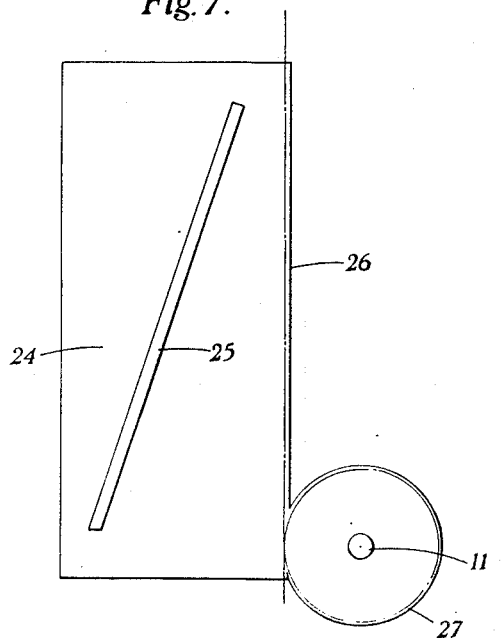
Figure 7 is a front elevation of an analyzing member constructed according to a further modification.

Instead of rotating the analyzing member it may be moved rectilinearly, in which case it would take the form of an analyzing slide 24 (Figure 7) provided with a diagonal contact strip 25 and driven from the rotating shaft 11 by means of a rack 26 and pinion 27. As will be readily understood the analyzing member may be of cylindrical form and the contact strip or studs arranged as a helix.

What I claim is:
1. In an apparatus for entering into a register values represented by the selective projection of elements, an analyzing member adapted to engage successively with said projected elements for successively analyzing the various denominations, a plurality of registering elements each of which is individual to one denomination, a plurality of clutches, each adapted when operated to engage and drive one of said registering elements, means driven in synchronism with said analyzing member for successively driving each of said clutches during each analyzing cycle, a plurality of clutch operating members each of which is adapted to operate one of said clutches, a plurality of springs each of which is adapted to operate one of said clutch operating members, a single control device common to all said clutch operating members for holding the said members against the action of their springs, means for actuating said control device upon engagement of the analyzing member with said projected elements to permit the operation of said clutch operating members under the action of their springs, and a plurality of cams driven in synchronism with said analyzing member, said cams normally locking said clutch operating members against actuation by their springs, this locking action being independent of the holding action exerted by the control device and adapted to permit only one clutch operating member at a time to be actuated.

2. A device according to claim 1 wherein the analyzing member is rotatably mounted and electric contact means are provided for analyzing all possible values of all denominations during a single revolution of the analyzing member.

3. A device according to claim 1 wherein the analyzing member is rotatably mounted and helically arranged electric contact means are provided on the analyzing member for analyzing all possible values of all denominations during a single revolution of the analyzing member.

4. In an apparatus for entering into a register values represented by the selective projection of elements, an analyzing member having an electric contact element for each possible value of each possible denomination, said contact elements being arranged to engage successively with said projecting elements in succession during each analyzing cycle, a plurality of registering elements each of which is individual to one denomination, a plurality of clutches, each adapted when operated to engage and drive one of said registering elements, means driven in synchronism with said analyzing member for successively driving each of said clutches during each analyzing cycle, a plurality of clutch operating members each of which is adapted to operate one of said clutches, a plurality of springs each of which is adapted to operate one of said clutch operating members, a single electromagnet common to all said clutch operating members for holding the said members against the action of their springs, an interrupter relay for switching off the said electromagnet when one of said contact elements on the analyzing member makes contact with one of said projecting elements, to permit the operation of said clutch operating members under the action of their springs, and a plurality of cams driven in synchronism with said analyzing member, said cams normally locking said clutch operating members against actuation by their springs, this locking action being independent of the holding action exerted by the electromagnet and adapted to permit only one clutch operating member at a time to be actuated.

DANIEL BROIDO.